Aug. 23, 1938. A. R. HUTCHINSON ET AL 2,127,972

MEANS FOR SUPPORTING REMOVABLE VEHICLE BODIES

Filed June 17, 1936

Inventors
Allen Robert Hutchinson
Lancelot John Hutchinson
by Wright, Brown, Quinby & May
Attys.

Patented Aug. 23, 1938

2,127,972

UNITED STATES PATENT OFFICE 2,127,972

MEANS FOR SUPPORTING REMOVABLE VEHICLE BODIES

Allan Robert Hutchinson and Lancelot John Hutchinson, Glen Iris, Victoria, Australia Application June 17, 1936, Serial No. 85,680
In Australia June 21, 1935

4 Claims. (Cl. 280—44)

This invention has reference to means in improvements for supporting removable vehicle bodies and is particularly adaptable to that class of transport vehicle where a plurality of removable bodies are used in association with a single power driven vehicle framework or trailer framework having trackways provided thereon to receive wheels or rollers mounted upon the under side of the bodies.

Hitherto difficulties have been experienced in connection with such transport systems in aligning the trackways upon the vehicle framework with those on the top of the framework employed to receive and hold the removable body during loading and unloading in the absence of the motor or other vehicle. The most serious of these aligning difficulties has been the very great variation in the level of the trackways upon the vehicle framework from time to time due to the great range of spring compression of the vehicle framework between the extremes of unloaded and fully loaded conditions.

The main object of the present invention is to provide an adjustable framework construction adapted to receive a removable body of the class hereinbefore mentioned interchangeably between a vehicle framework irrespective of the unloaded or loaded condition of said vehicle framework.

With the above object in view the present invention consists in a movable framework construction having trackways to receive a removable body, or two such bodies side by side, the said framework construction being provided with wheels or rollers associated with adjustable means to satisfactorily align the said trackways with those of a co-acting vehicle framework for the interchangeable transference of a removable body from either one set of co-acting trackways to the other.

The invention is characterized by apparatus consisting in a reinforced framework construction comprising trackways adapted to receive a wheel or roller mounted removable body, or two such bodies side by side, the said framework construction having three or more supports terminated with wheels or rollers in contact with the ground or suitable guideways, means being provided for the vertical adjustment of the trackways of the framework to accord in level with trackways disposed on a transport vehicle the said adjustment means preferably comprising a quick acting screw and nut or alternatively pneumatic or hydraulic jack or rack and pinion, means being included for effecting the horizontal alignment of the co-relative trackways of the framework and transport vehicle said means preferably comprising splayed attachments to the trackways upon the framework construction and adapted to guide the trackways of the vehicle into juxtaposition with the said trackways of the framework construction while the supporting wheels or rollers may be adapted to be turned and fixed transversely of their normal direction to facilitate the alignment process.

An important feature embodied in our invention is the provision with the framework construction of vertical adjustment means for raising or lowering one end of said framework construction for alignment purposes with co-acting vehicle framework.

Another important feature embodied in our invention is that the framework construction may incorporate dual sets of trackways to enable a transport vehicle to have a loaded or unloaded body removed therefrom and replaced by another loaded or unloaded body while the said transport vehicle remains in a stationary position.

Other features of this invention are described hereinafter with reference to the accompanying drawing in which:—

Figure 3:
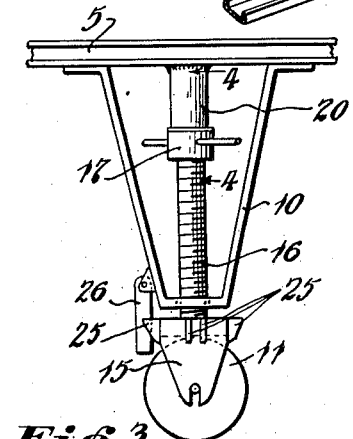
Figure 3 is a detail of the adjustable support of the framework construction.
Figure 4:
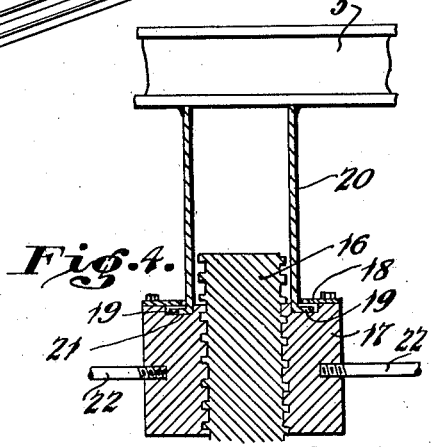
Figure 4 is a sectional detail elevation of line 4—4 of Figure 3.

According to one form of carrying our invention into practical effect, we provide a horizontal framework construction 5 having channeled trackways 6 disposed on the top thereof for the reception of wheels or rollers of a road transport vehicle body. The framework 5 is provided with two brackets or legs 9 at one end and with two brackets 10 at the other end, the brackets 10 being associated with supporting means for the framework adjustable to elevate or lower the adjacent end thereof. Each of the brackets 9 and 10, as shown, may have a V-shape, this shape resulting in great strength and rigidity in comparison with the weight of the bracket. The brackets 9 carry at their lower ends bearing blocks 15 in which are journaled suitable rollers or wheels 11. The brackets 10 are provided at their lower ends with suitable guiding apertures through which slidably extend vertical shafts 16, each shaft having secured to the lower end thereof a bearing block 15 in which is journaled a wheel or roller 11. As indicated, these rollers may, if desired, be detachable from their bearing blocks. The shafts 16 are screw-threaded, the upper portion of each shaft being in threaded engagement with a nut 17 which is rotatably supported at the lower end of a tubular anchoring member 20 which is secured to and projects downward from the frame 5. As shown, each tubular member 20 is disposed between the legs of the corresponding bracket 10. The upper end of each shaft 16 is adapted to project into its tubular member 20 to a greater or lesser extent according to the rotation of the nut 17. In order to support its nut, each tubular member 20 may be provided with a flange 19 at its lower end which is seated in an annular groove 21 in the upper face of the nut. An annular ring 18 is secured on the upper face of the nut so as to overlap the flange 19 and thus to retain the nut in correct relation with respect to the tubular member 20. A pair of radial handles 22 may be provided to facilitate the rotation of the nut 17. It is evident that rotation of such nut will result in the raising or lowering of the nut on the shaft 16 and hence the raising or lowering of the corner of the frame 5 supported by such shaft. In order to prevent rotation of the bearing block 15 and shaft 16 when the nut 17 is rotated, a latch 26 may be mounted on the bracket 10 so as to engage between a pair of ears 25 on the block 15. As shown in Figure 3, this latch may be pivotally mounted so as to swing clear of the ears when desired. Four pairs of such ears may be supplied on the block 15 so that the block may be secured in any one of four angular positions with reference to the bracket 10. By rotation of the nuts 17, the receiving ends of the trackways 6 may be vertically adjusted so as to be alined with co-acting trackways 13 of a road transport vehicle from which a movable body may be shifted onto the trackways 6.

The vertical adjustment means at the latter end of the framework 5 preferably comprises a casting 15 carrying in a detachable manner the wheel or roller 11 the said casting 15 being disposed on the lower end of a threaded shaft or spindle 16, preferably a quick acting thread, the said threaded shaft 16 engaging with a nut 17 adapted to rotate but fixed in vertical relationship to the trackways 6. The nut 17 is anchored in position by a ring 18 mounted to the top thereof, the said ring 18 engaging with the flange 19 of an anchoring member 20 fixed to the framework construction 5 or trackways 6, the flange 19 of said anchoring member 20 being disposed in a groove 21 formed in the top of the nut 17 thereby permitting the nut 17 to be rotated in order to move the threaded shaft 16 in a vertical manner and raise or lower as desired the adjacent end of the framework construction 5, operating handles 22 being provided on the nut 17 to facilitate said nut 17 being turned.

The castings 15 carrying the wheels 11 may be provided with spaced lugs 25 on two or more sides and adapted to receive a projecting lug or tongue 26 pivotally mounted on one side of the supports 10 when the said casting 15 is correctly positioned for moving the framework construction 5 longitudinally or laterally, the engagement of the tongue 26 with the lugs 25 preventing the casting 15 from rotating.

Each trackway 6 of the framework construction 5 is provided with splayed or aligning guides 23 on the end adapted to be adjusted to varying heights from the ground the said guides 23 facilitating the trackways 13 of the transport vehicle and the trackways 6 of the framework construction 5 to be aligned.

Disposed near the end of one of the trackways 6 of each set opposite the end carrying the splayed guides 23 is provided a locking arrangement 24 either automatic or manual for the purpose of securely retaining the removable body on the framework construction 5 until released at the will of the operator.

Figure 1:
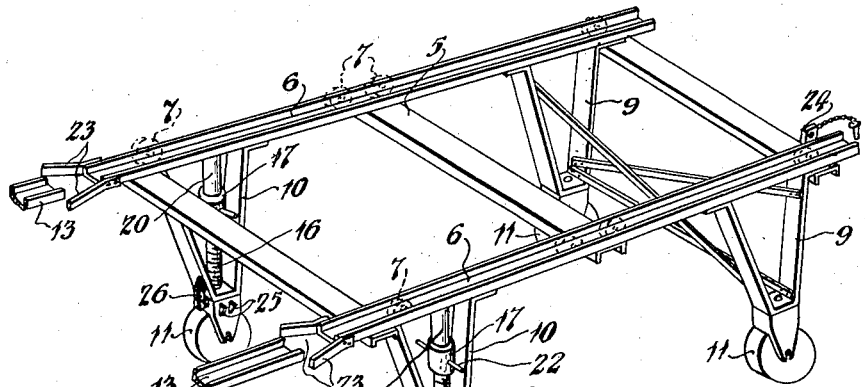
Figure 1 is a perspective view of the adjustable framework construction having its trackways disposed in alignment with co-acting trackways of a road transport vehicle.
Figure 2:
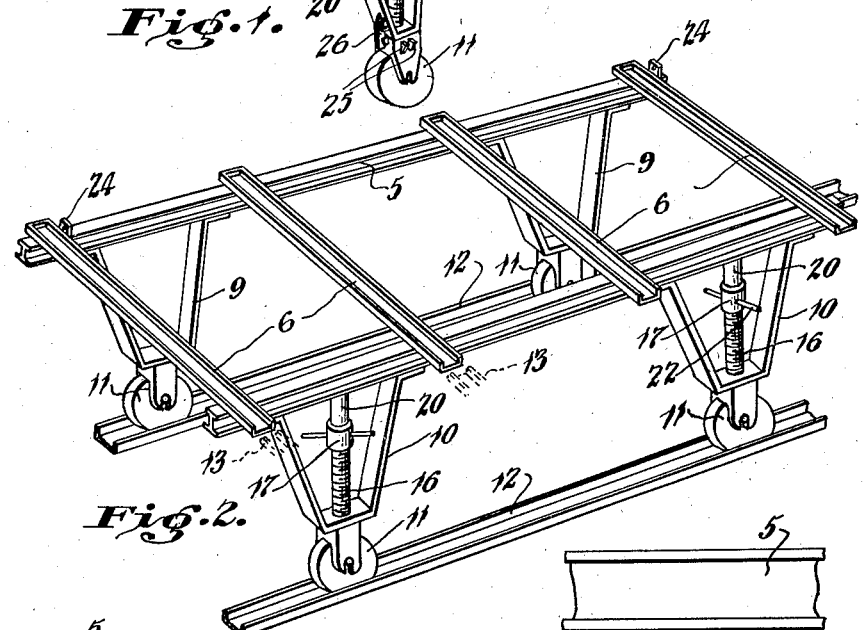
Figure 2 is a perspective view of the adjustable framework construction disposed in guideways and incorporating two sets of trackways.

In a modified form of construction the framework construction 5 is provided with a plurality of sets of trackways 6 as illustrated in Figure 2 of the accompanying drawing, the wheels 11 of said framework construction 5 being adapted to travel in guideways 12 in order that a loaded or unloaded transport vehicle body may be transferred from the trackways 13 of the road transport vehicle on to one set of trackways 6 of the framework construction 5, an unloaded or loaded vehicle body already positioned on the other set of trackways 6 of the framework construction 5 being adapted to be transferred on to the transport vehicle after the said framework construction 5 has been moved into correct alignment with the stationary transport vehicle.

What we claim as our invention and desire to secure by Letters Patent is:—

1. Apparatus for the purpose specified, characterized by a horizontal frame, support means for said frame including a plurality of tubular members projecting downward from said frame, each said member having a flange at the lower end thereof, a nut aligned with and rotatably supported by each said member, a threaded shaft in threaded engagement with each said nut and projecting downward therefrom, a bearing block secured to the lower end of each said shaft, a roller journaled in each said block, means for releasably holding said block and shaft against rotation, and a guide member for each shaft rigidly secured to said frame and surrounding its shaft at a point near its respective bearing block.

2. Apparatus for the purposes specified, characterized by a horizontal frame, support means for said frame including a tubular member projecting downward from said frame, said member having a screw-threaded shaft with its upper end loosely disposed therein, a rotatable nut on said shaft below said tubular means, means for preventing axial movement of said nut relative to said tubular member, a bearing block secured to the lower end of said shaft, a roller journaled in said block, and means extending down from said frame to provide lateral support for the lower portion of said shaft and to hold said shaft against rotation.

3. Apparatus for the purposes specified, characterized by a horizontal frame, support means for said frame including a tubular member projecting downward therefrom, a screw-threaded shaft having its upper end portion loosely disposed in said tubular member, a nut rotatably mounted on said shaft, means holding said nut against axial movement relative to said frame, a roller mounted on said shaft at the lower end thereof, a bracket secured to said frame engaging said shaft near the lower end thereof to provide lateral support for the same, and means carried by said bracket for preventing rotation of said shaft.

4. Apparatus for the purposes specified, characterized by a horizontal frame, support means for said frame including a tubular member projecting downward therefrom, a screw-threaded shaft having its upper end portion loosely disposed in said tubular member, a nut rotatably mounted on said shaft, means holding said nut against axial movement relative to said frame, a bearing block mounted on the lower end of said shaft, a roller journaled in said bearing, a bracket secured to the frame and engaging said shaft near its lower end to provide lateral support therefor, and means on said bracket and block releasably engaging each other to prevent rotation of said shaft.

ALLAN ROBERT HUTCHINSON.
LANCELOT JOHN HUTCHINSON.